United States Patent [19]
Baechtold

[11] 3,819,879

[45] June 25, 1974

[54] ELECTRO-ACOUSTIC TRANSDUCER HOUSING ADAPTED FOR TELEPHONIC PCM COMMUNICATION SYSTEMS

[75] Inventor: Werner Baechtold, Thalwil, Switzerland

[73] Assignee: International Business Machines Corporation, Armonk, N.Y.

[22] Filed: Nov. 13, 1972

[21] Appl. No.: 306,258

[30] Foreign Application Priority Data

Dec. 20, 1971 Switzerland ........................ 1869/71

[52] U.S. Cl. ........... 179/179, 179/107 FD, 179/182

[51] Int. Cl. ............................................ H04m 1/02

[58] Field of Search ..... 179/179, 180, 182, 107 FD, 179/1 D, 1 E, 1 P; 181/33 R, 33 D, 33 L, 23

[56] References Cited

UNITED STATES PATENTS

| | | | |
|---|---|---|---|
| 3,246,721 | 4/1966 | Martin | 179/180 |
| 3,586,794 | 6/1971 | Michaelis | 181/23 |

*Primary Examiner*—Ralph D. Blakeslee

*Attorney, Agent, or Firm*—Graham S. Jones, II

[57] ABSTRACT

A telephone receiver handset includes a cover with a built-in structural acoustic Helmholtz resonator forming a low pass acoustical filter integral with the cover when applied to the capsule for the electro-acoustic transducer.

7 Claims, 6 Drawing Figures

ELECTRO-ACOUSTIC TRANSDUCER HOUSING ADAPTED FOR TELEPHONIC PCM COMMUNICATION SYSTEMS

BACKGROUND OF THE INVENTION

1. Field of the Invention

This invention relates to dampers for electro-acoustic devices for uses including telephony and acoustics, and relates more particularly to diaphragms, mountings, mufflers and sound filters.

2. Description of the Prior Art

Pulse Code Modulation (PCM) is used today on an expanding scale in communications because it has several advantages, e.g., optimum utilization of channel capacity, increased application of integrated circuits which can be economically mass-produced, suitability for error detection and correction, and easy integration of data, voice and video communication.

Voice signals are sampled for PCM coding with a frequency which is slightly higher than twice the frequency that is to be preserved as the upper frequency limit ($f_s>2f_g$). Each sample value is coded, transmitted and reconverted to an analog value in the receiver. Therefore, the voice signal in the receiver is assembled from partial signals which also become available with sampling frequency.

If the frequency range of the transmitted and the received signals were not limited, the folded voice spectrum would appear in the receiver signal in a frequency range up to sampling frequency (i.e., up to twice the desired frequency limit), and therefore would constitute a disturbing noise signal.

To eliminate this effect in apparatus for PCM voice communication, up to now low pass electric filters have been used for the transmitting as well as the receiving functions. Such a low-pass filter had an upper frequency limit between the desired voice frequency limit of usually 3,400 Hz and half the sampling frequency (e.g., $f_s/2 = 4,000$ Hz). This effectively eliminates noise produced by folding.

Electric filtering is expensive, because required inductances can not be manufactured in integrated circuit technology. To provide such filters in all telephone sets is not economically feasible. Thus PCM coding can be used only for transmission between central exchanges, with such equipment.

Swiss Pat. No. 395,192 of Beil et. al., describes an electro-acoustic transducer including a diaphragm with a device for improving the frequency characteristics of the transducer including one resonator arranged in the space in front of the diaphragm. From the sound flux generated by the diaphragm, only that fraction which passes directly along openings 23, 24 of the Swiss patent is influenced by the resonator. There can be only one or two such openings because the pipe channels must have a length which equals one-half wave length of the sound to be absorbed. Since only the fraction of the sound generated by the diaphragm which passes directly along openings 23,24 is influenced by the resonator, much noise passes through the unit. Also, the formation of the resonator involves not just the simple step of molding the ear cover simultaneously with the resonator structure, but also requires manufacturing the pipe channels 21,22 which are enclosed by solid material except at their ends.

OBJECTS OF THE INVENTION

It is an object of the invention to provide a device and method by which satisfactory low pass filtering in telephone sets can be achieved in a simple way.

It is known in the art to modify the frequency characteristic in telephone handsets by giving a particular shape to the electro-acoustic transducers (microphone, earpiece) or to the entire cavities surrounding them. This is particularly used for expanding or limiting the frequency range or for smoothing the frequency response curve within the desired frequency range, i.e., for compensation of resonance effects.

It is another particular object of the invention to provide a solution for acoustic filtering which allows, achieving a steep decrease after this limit with simple means, despite a uniform frequency response up to the desired limit, so that the frequency range above half the sampling frequency can be effectively suppressed.

SUMMARY OF THE INVENTION

The invention is concerned with a housing for an electro-acoustic transducer, particularly for telephone apparatus, comprising a first cavity between the electro-acoustic transducer and a cover forming part of the housing. The first cavity connects the transducer to the exterior through holes in the cover. In connection with the first cavity a second cavity is provided constituting a Helmholtz resonator for absorbing the sound at its resonant frequency.

Further in accordance with this invention a housing includes a cover with holes in it. A transducer capsule contains an electro-acoustic transducer. A first cavity is between the transducer and the cover. The first cavity connects the transducer acoustically to the exterior through the holes. The improvement includes a second cavity comprising a Helmholtz resonator for absorbing sound at its resonant frequency connected with the first cavity by means of an aperture. Preferably the second cavity and said aperture are ring-shaped, and have the shape of concentric rings. Preferably, the cover is shaped circularly and serves to keep an electro-acoustic transducer in its position. The cover includes two ring-shaped protrusions and a ring-shaped recess between them, the outer ring-shaped protrusion being so structured to rest tightly on said capsule so that a narrow channel remains between the inner ring-shaped protrusion and the capsule. The channel forms the aperture of said Helmholtz resonator, and the cavity for said resonator is formed by the ring-shaped recess. Preferably the inner ring-shaped protrusion is structured for positioning opposite the holes of the capsule of the electro-acoustic transducer. Preferably the apparatus is useful as telephone apparatus in a communication system in which voice signals are transmitted in PCM coding, characterized in that the resonant frequency of the Helmholtz resonator is substantially at least equal to one-half of the PCM sampling frequency.

Further the apparatus in accordance with this invention includes a housing cover and a transducer capsule containing an electro-acoustic transducer. The capsule includes an opening connecting the transducer acoustically therethrough. The improvement comprises the cover including on its inside surface in connection with the capsule a resonant cavity having a restricted entrance for absorbing audible acoustic energy. The resonant cavity includes an aperture at its inlet, and the aperture and the opening in the capsule are in close proximity.

BRIEF DESCRIPTION OF THE DRAWINGS

An embodiment of this invention is shown in the attached drawings described below.

DESCRIPTION OF THE PREFERRED EMBODIMENT

Figure 1A:
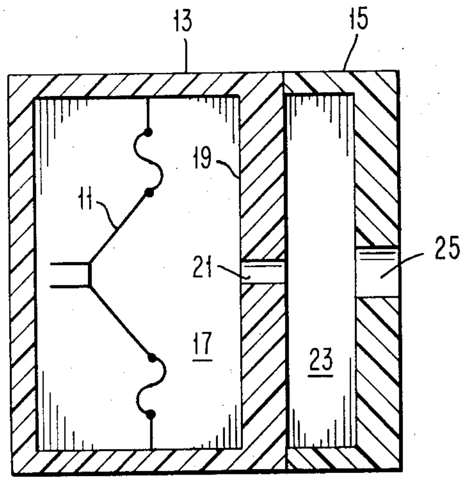
FIG. 1A PRIOR ART
FIG. 1A is a schematic representation of a conventional housing for electro-acoustic transducers in telephone handsets.

A sectional view of a conventional housing for a telephone earphone capsule is shown schematically in FIG. 1A. Diaphragm 11 of an electro-acoustic transducer is located in a capsule 13. Capsule 13 is kept in place and mechanically protected by cover 15, shown in part. For more complete detail see cover 53 in FIG. 3. In front of diaphragm 11 there is an air cavity 17 which is closed by a wall 19. Wall 19 has one or more holes 21 through it. The cover 15 forms another air cavity 23 in front of capsule 13 which communicates with the exterior through one or more holes 25.

Figure 1B:
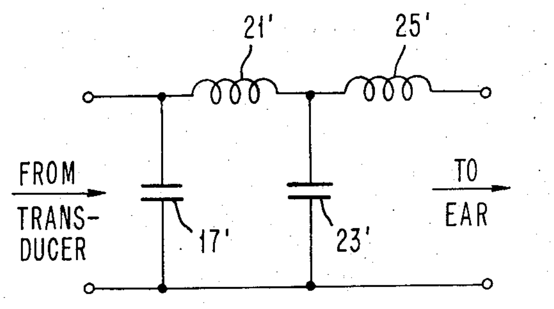
FIG. 1B is an electric equivalent circuit diagram for the housing of FIG. 1A.

FIG. 1B is the electric equivalent circuit diagram of the assembly described above. Cavities 17 and 23 are acoustic compliances, represented by capacitors 17' and 23'. Holes 21 and 25 are acoustic masses, represented by inductors 21' and 25'.

It has been attempted to achieve a uniform frequency behaviour in the usual range (0 . . . . . 3,400 Hz) by suitably shaping the cavities. However, in the region just above the frequency limit, the slope of the curve is not as steep as desirable. Therefore, a considerable portion of the noise signal in the frequency range above half the sampling frequency is reproduced by conventional devices.

Figure 2A:
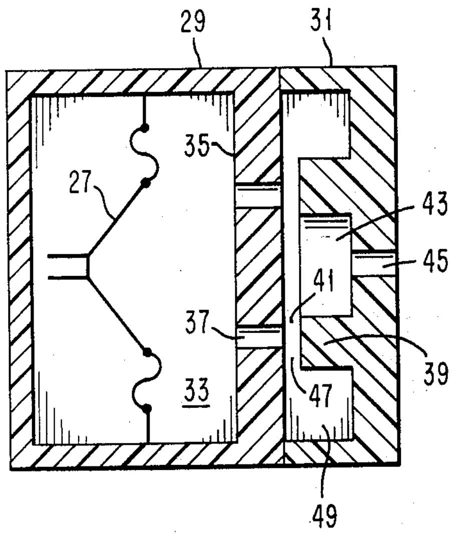
FIG. 2A is a schematic representation of a housing for electro-acoustic transducers in telephone handsets, according to the invention.

A significant improvement is gained by using a housing designed according to the instant invention. Such a housing is shown schematically in FIG. 2A. The transducer has a diaphragm 27 and is enclosed by a capsule 29. The earphone capsule shown in FIG. 2A is practically equal to that shown in FIG. 1A. (It may be noted that all statements made are valid also for a microphone). The capsule is held in place and protected by a cover 31. The outside shape of cover 31 is substantially identical to that of cover 15 in FIG. 1A, but would actually look like the cover 53 in FIG. 3.

Between the diaphragm 27 and wall 35 there is a cavity 33, and wall 35 has holes 37 therethrough. This corresponds to what is shown in FIG. 1A, but the location of the holes is significantly different.

The essential difference is the shaping of the inside surface of cover 31. A cavity 43 and a hole 45 (possibly a plurality of holes) are also provided in this case. However, in addition a closed cavity 49 (or a plurality of cavities) is provided which is connected to the main cavity 43 by an aperture in the form of a narrow annular channel 41,47. Cavity 49 constitutes a Helmholtz resonator with a resonant frequency equal to half the PCM sampling frequency. Helmholtz resonators have a high Q factor which is particularly useful in this situation because the slope of the frequency response curve must be very steep so that the influence in the band pass range is reduced to a minimum.

Figure 2B:
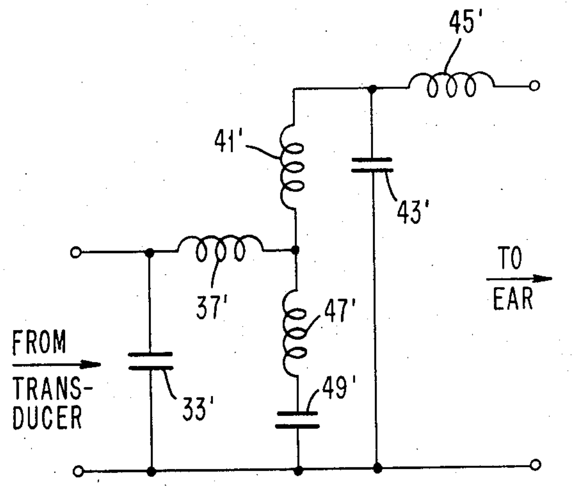
FIG. 2B is an electric equivalent circuit diagram for the housing of FIG. 2A.

The electric equivalent circuit diagram of the embodiment of the invention is shown in FIG. 2B. Cavities 33, 43, 49 constitute acoustic compliances corresponding to capacitors 33', 43' and 49'. Holes 37 and 45 and aperture 41, 47 correspond to inductors 37', 41', 45' and 47' because of their effect as masses. In FIG. 2B it can be seen clearly that the Helmholtz resonator acts as absorption means or shunt for a given frequency, whereas the other parts of the assembly have essentially conventional properties.

Figure 3:
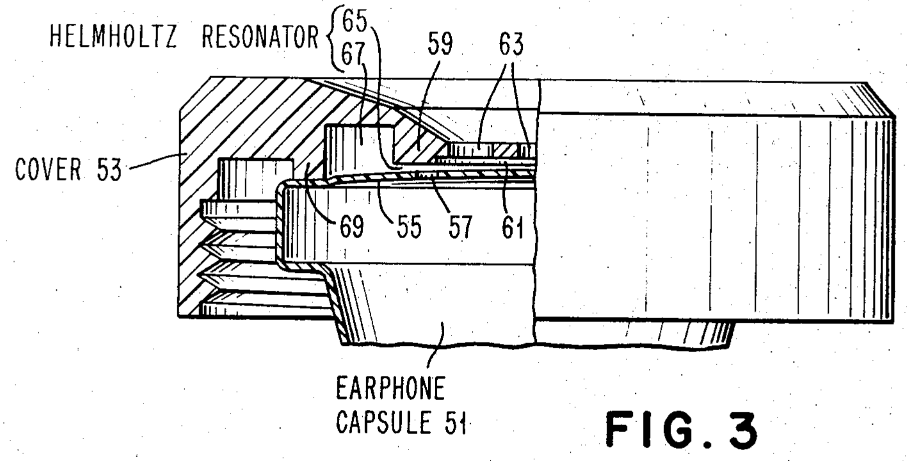
FIG. 3 is a housing cover designed according to the invention corresponding to FIG. 2A, for a conventional earphone capsule.

The Helmholtz resonator can be made simply from material for usual plastic covers of earphone capsules (or microphones, respectively). An example is shown in FIG. 3. The earphone capsule is designated 51, the cover 53. Only the exterior housing of the earphone capsule is shown and not its contents (diaphragm, etc.) The earphone capsule has a covering wall 55 with holes 57 (corresponding to parts 35 and 37 in the schematic representation of FIG. 2A). The sound flux reaches the ear through cavity 61 (corresponding to cavity 43 in FIG. 2A) and holes 63 in the plastic cover (corresponding to 45 in FIG. 2A.)

Ring shaped protrusion 59 forms a narrow channel 65 to which a ring-shaped recess 67, completed by another ring-shaped protrusion 69, is connected; these elements together have the effect of a Helmholtz resonator (corresponding to parts 47 and 49 in FIG. 2A). Such housing covers, which are in accordance with the invention, can be manufactured in large quantities similarly to conventional covers now in use. Only a modification of the shape of the cover and possibly of the earphone capsules (or microphones) used, is necessary.

The design of the Helmholtz resonator is calculated according to known rules which are briefly reviewed in the following:

Resonant Frequency:

$$f_{res}=1/2\pi\ \sqrt{M_H C_H}$$

Acoustic Mass:

$$M_H=g\cdot l/F$$

whereby

Air density: $g$=1.18 Kg/m$^3$

Length of acoustic mass: $l$ is a selectable value

Cross-section of the acoustic mass: $F$ is a selectable value

Acoustic Compliance:

$$C_H=V/\gamma\cdot P_0$$

whereby

Volume of cavity: $V$ is a selectable value

Ratio of specific heat of gas at constant pressure to specific heat at constant value: $\gamma$=1.4 (for air)

Air pressure: $P_0 \cong 10^5$ N/m$^2$

The following dimensions may be chosen for a Helmholtz resonator having a resonant frequency of 4 kHz:

| | |
|---|---|
| Cross-section of aperture | F=25 mm² |
| Length of aperture | $l$=2 mm. |
| Volume of cavity | $V$=2,4 cm² |

Figure 4:
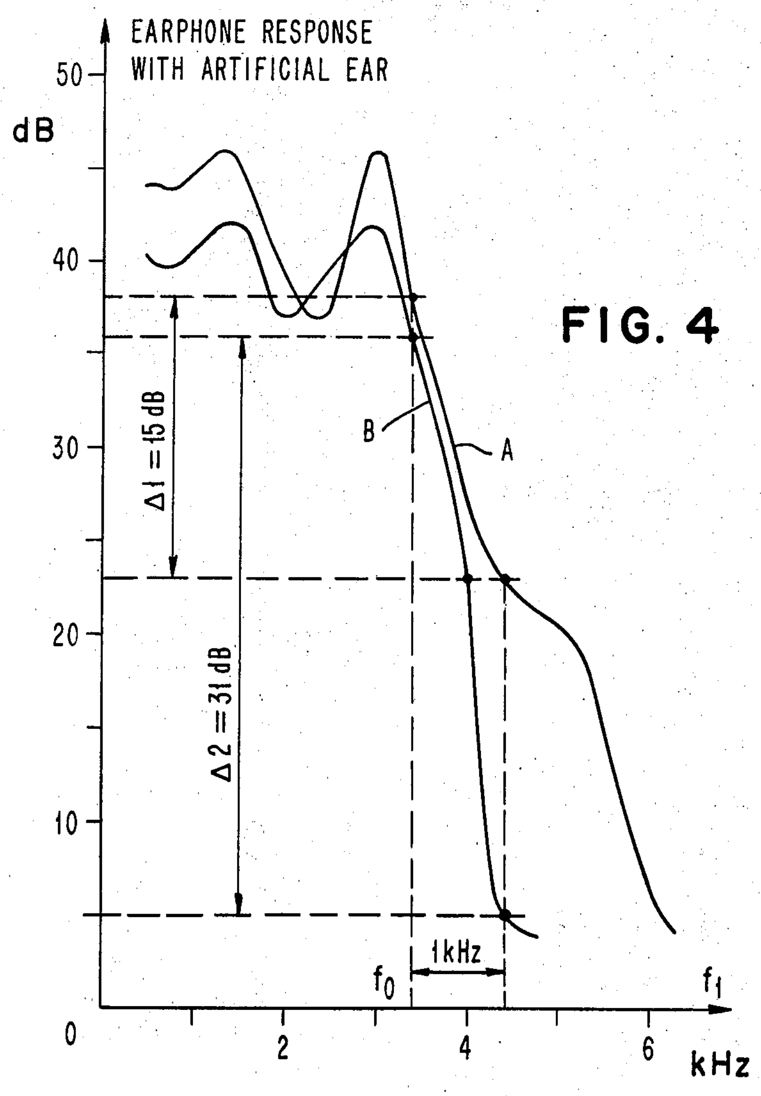
FIG. 4 shows frequency response curves measured at the earphone for a conventional housing and a housing constructed in accordance with this invention.

FIG. 4 shows frequency response curves of a telephone earphone for two different housing assemblies:

A=with conventional cover;

B=with a cover shaped in accordance with the invention.

The curves were measured with an artificial ear. The difference of the two response values at the frequency limit (3,400 Hz) and at a frequency which is 1 kHz higher, can be increased by approximately 15 dB with the aid of the invention.

Thus the invention allows considerable reduction of the noise signal through acoustic filtering. Because of the elimination of electric filters there is a decrease in the amount of hardware required for PCM transmission, which should extend as far as to the terminals (telephone apparatus).

What is claimed is:

1. In an electroacoustic transducer housing including a cover with holes therein,
   - a transducer capsule having a face and containing an electro-acoustic transducer and having apertures in the face thereof, the improvement comprising
   - a first, central cavity formed by said face of said transducer capsule and said cover,
   - said first cavity coupling said apertures of said transducer acoustically to the exterior through said cavity and said holes in said cover,
   - a second cavity formed by said cover and the periphery of said face of said capsule comprising a Helmholtz resonator for absorbing sound at its resonant frequency connected with said first cavity by means of an aperture formed by and between said cover and said face.

2. Apparatus in accordance with claim 1 wherein said second cavity and said aperture are ring-shaped.

3. Apparatus in accordance with claim 1 wherein said second cavity and said aperture have the shape of concentric rings.

4. Apparatus in accordance with claim 1 wherein said cover is shaped circularly and serves to keep an electro-acoustic transducer in its position, said cover including two ring-shaped protrusions and a ring-shaped recess between them, the outer one of said ring-shaped protrusions being so structured to rest tightly on said capsule so that a narrow channel remains between the inner one of said inner ring-shaped protrusions and said capsule,
   - said channel forming the aperture of said Helmholtz resonator, and
   - said cavity for said Helmholtz resonator being formed by said ring-shaped recess.

5. Apparatus in accordance with claim 4 wherein said inner ring-shaped protrusion is structured for positioning opposite said holes of said capsule of said electro-acoustic transducer.

6. Apparatus in accordance with claim 1 comprising a telephone apparatus of a communication system in which voice signals are transmitted in PCM coding, characterized in that the resonant frequency of said Helmholtz resonator is substantially at least equal to one-half of the PCM sampling frequency.

7. In a housing including
   - a cover having sound holes therein,
   - a transducer capsule containing an electro-acoustic transducer,
   - said capsule having a face including an opening connecting said transducer acoustically therethrough, the improvement comprising
   - said cover including on its inside surface a recess forming in combination with said face of said capsule a resonant cavity having a restricted entrance for absorbing audible acoustic energy,
   - said restricted entrance comprising an aperture formed between said face and said cover
   - said aperture and said opening in said capsule being in close proximity
   - said cover and said face forming a central cavity communicating between said opening in said face and said sound holes.

* * * * *